United States Patent
Chen et al.

(10) Patent No.: US 12,345,567 B2
(45) Date of Patent: Jul. 1, 2025

(54) ROAD SURFACE CONDITIONS DETECTION BY DISTRIBUTED OPTIC FIBER SYSTEM

(71) Applicant: NEC Laboratories America, Inc., Princeton, NJ (US)

(72) Inventors: Yuheng Chen, South Brunswick, NJ (US); Ming-Fang Huang, Princeton, NJ (US); Ting Wang, West Windsor, NJ (US); Jingnan Zhao, Edison, NJ (US)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 17/987,007

(22) Filed: Nov. 15, 2022

(65) Prior Publication Data

US 2023/0152150 A1 May 18, 2023

Related U.S. Application Data (60) Provisional application No. 63/280,258, filed on Nov. 17, 2021.

(51) Int. Cl.
*G01H 9/00* (2006.01)
*G01P 3/36* (2006.01)
(Continued)

(52) U.S. Cl.
CPC ............... *G01H 9/004* (2013.01); *G01P 3/36* (2013.01); *G06N 3/08* (2013.01); *G06N 20/10* (2019.01)

(58) Field of Classification Search
CPC .......... G01H 9/004; G06N 20/10; G06N 3/08; G01P 3/36
(Continued)

(56) References Cited

U.S. PATENT DOCUMENTS

2018/0266902 A1   9/2018  Logan et al.
2019/0236477 A1*  8/2019  Huang ................. G08G 1/0116
(Continued)

FOREIGN PATENT DOCUMENTS

CN       107591002 A   *  1/2018
CN       106600981 B   * 12/2018   ........... G08G 1/0125
WO   WO-2020257167 A1  * 12/2020   ........... G06K 9/0063

OTHER PUBLICATIONS

Machine Translation of CN 106600981 (Year: 2018).*
(Continued)

*Primary Examiner* — Alexander A Mercado
(74) *Attorney, Agent, or Firm* — Joseph Kolodka (57) ABSTRACT

A fiber optic sensing cable located along a side of a paved road and runs parallel to a driving direction is monitored by distributed fiber optic sensing (DFOS) using Rayleigh backscattering generated along the length of the optical sensor fiber cable under dynamic vehicle loads. The interaction of vehicles with roadway locations exhibiting distressed pavement generates unique patterns of localized signals that are identified/distinguished from signals resulting from vehicles operating on roadway exhibiting a smooth pavement surface. Machine learning methods are employed to estimate an overall road surface quality as well as localizing pavement damage. Power spectral density estimation, principal component analysis, support vector machine (SVM) combined with principal component analysis (PCA), local binary pattern (LBP), and convolutional neural network (CNN) are applied to develop the machine learning models.

4 Claims, 5 Drawing Sheets

(51) Int. Cl.
*G06N 3/08* (2023.01)
*G06N 20/10* (2019.01)

(58) Field of Classification Search
USPC .................................................. 73/655, 643
See application file for complete search history.

(56) References Cited

U.S. PATENT DOCUMENTS

| | | | |
|---|---|---|---|
| 2020/0003588 A1* | 1/2020 | Huang | G06Q 50/40 |
| 2022/0230539 A1* | 7/2022 | Han | G08G 1/04 |
| 2022/0333956 A1* | 10/2022 | Han | G01H 9/004 |

OTHER PUBLICATIONS

Machine Translation of CN 107591002 A (Year: 2018).*
Balzanella et al., "Automatic Classification of Road Traffic with Fiber Based Sensors in Smart Cities Applications", 2020, pp. 31-46 (Year: 2020).*
Hough Transforms—Science Direct, downloaded Oct. 3, 2024 (Year: 2024).*

* cited by examiner

ROAD SURFACE CONDITIONS DETECTION BY DISTRIBUTED OPTIC FIBER SYSTEM

CROSS REFERENCE

This application claims the benefit of U.S. Provisional Patent Application Ser. No. 63/280,258 filed 17 Nov. 2021 the entire contents of which being incorporated by reference as if set forth at length herein.

TECHNICAL FIELD

This disclosure relates generally to distributed fiber optic sensing (DFOS) systems, methods, and structures. More particularly, it discloses systems, methods, and structures for road surface conditions detection by DFOS techniques.

BACKGROUND

Road surface conditions can significantly impact the interaction between vehicles and road/pavement structure, which may cause high fuel consumption, increase vehicles' maintenance cost, and even induce safety issues of drivers. Pavement maintenance and rehabilitation actions are oftentimes determined based on the measured pavement distress and surface roughness condition.

Walking survey and imaged-based equipment are widely used approaches to detect pavement distress. Rutting measurement and internal profiler are used by—for example—state's department of transportation to measure and evaluate pavement roughness levels. However, these approaches require labor intensive field work tests and post-processing, and it is not compatible to continuous monitoring and communications using smart infrastructures. Early detection of abnormal surface conditions in real-time is needed to prevent pavement further damage and reduce agency and user costs induced by rough road surface conditions.

SUMMARY

An advance in the art is made according to aspects of the present disclosure directed to distributed fiber optic sensing of a roadway in which fiber optic sensing cable located along a side of a paved road and runs parallel to a driving direction is monitored by distributed fiber optic sensing (DFOS) using Rayleigh backscattering generated along the length of the optical sensor fiber cable under dynamic vehicle loads. The interaction of vehicles with roadway locations exhibiting distressed pavement generates unique patterns of localized signals that are identified/distinguished from signals resulting from vehicles operating on roadway exhibiting a smooth pavement surface. Machine learning methods are employed to estimate an overall road surface quality as well as localizing pavement damage. Power spectral density estimation, principal component analysis, support vector machine (SVM) combined with principal component analysis (PCA), local binary pattern (LBP), and convolutional neural network (CNN) are applied to develop the machine learning models.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1:
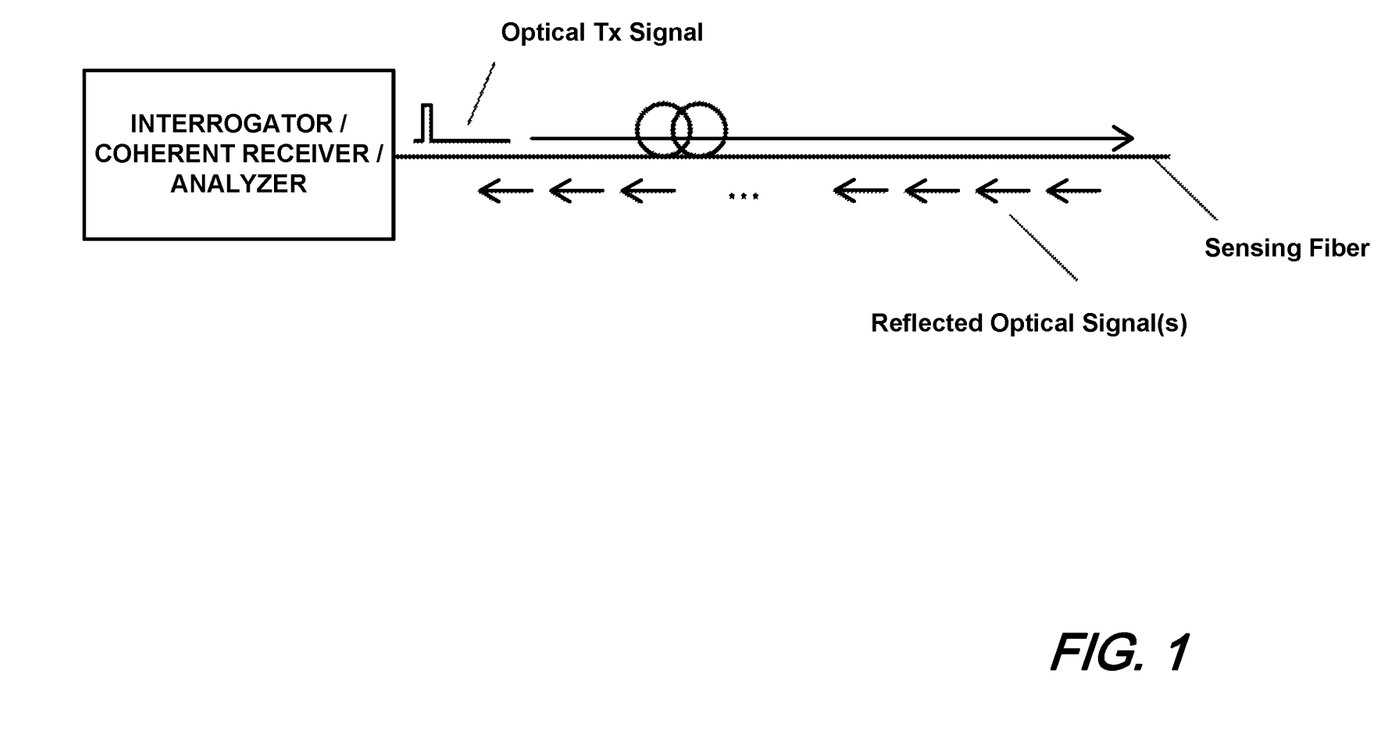
FIG. 1 is a schematic diagram showing an illustrative DFOS system according to aspects of the present disclosure.

FIG. 1 is a schematic diagram of a generalized, DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing (DAS) or distributed vibration sensing (DVS)) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable or a common fiber that simultaneously carries live telecommunications traffic in addition to the DFOS data.

Operationally, we assume that the DFOS system will be Rayleigh-scattering based system (e.g., distributed acoustic sensing or distributed vibration sensing) and Brillouin-scattering based system (e.g., Brillouin optical time domain reflectometry or BOTDR) and may include a coding implementation. With such coding designs, such systems will be most likely be integrated with fiber communication systems due to their lower power operation and will also be more affected by the optical amplifier response time.

Previously, we have described methods for road condition monitoring by analyzing sensing data in frequency domain and vehicle trajectories using DFOS systems. We now enhance those methods by employing spatial-temporal data from DFOS systems to realize in-service, automatically and continuously monitoring of pavement surface quality and detect major damage (i.e., potholes, cracking), and send alert messages to operators for rapid response and repair.

As those skilled in the art will understand and appreciate, such an approach requires several solutions to difficult problems namely: since DOFS systems detect signals of vehicles operating on a good quality road surface as well as a damaged, poor quality one, there is a need to identify any unique signal features when vehicles operate on damaged roadway, i.e., potholes, cracks, etc., from a normal, undamaged, road surface.

Accordingly, systems, methods and structures according to aspect of the present disclosure include at least two important features: one that estimates overall road surface quality, the other that identifies spots or roadway locations exhibiting major damage. For this second feature, an event(s) algorithm is described. As used herein, events are abnormal driving signals that are generated when a vehicle operates on road surface defects.

Figure 2:
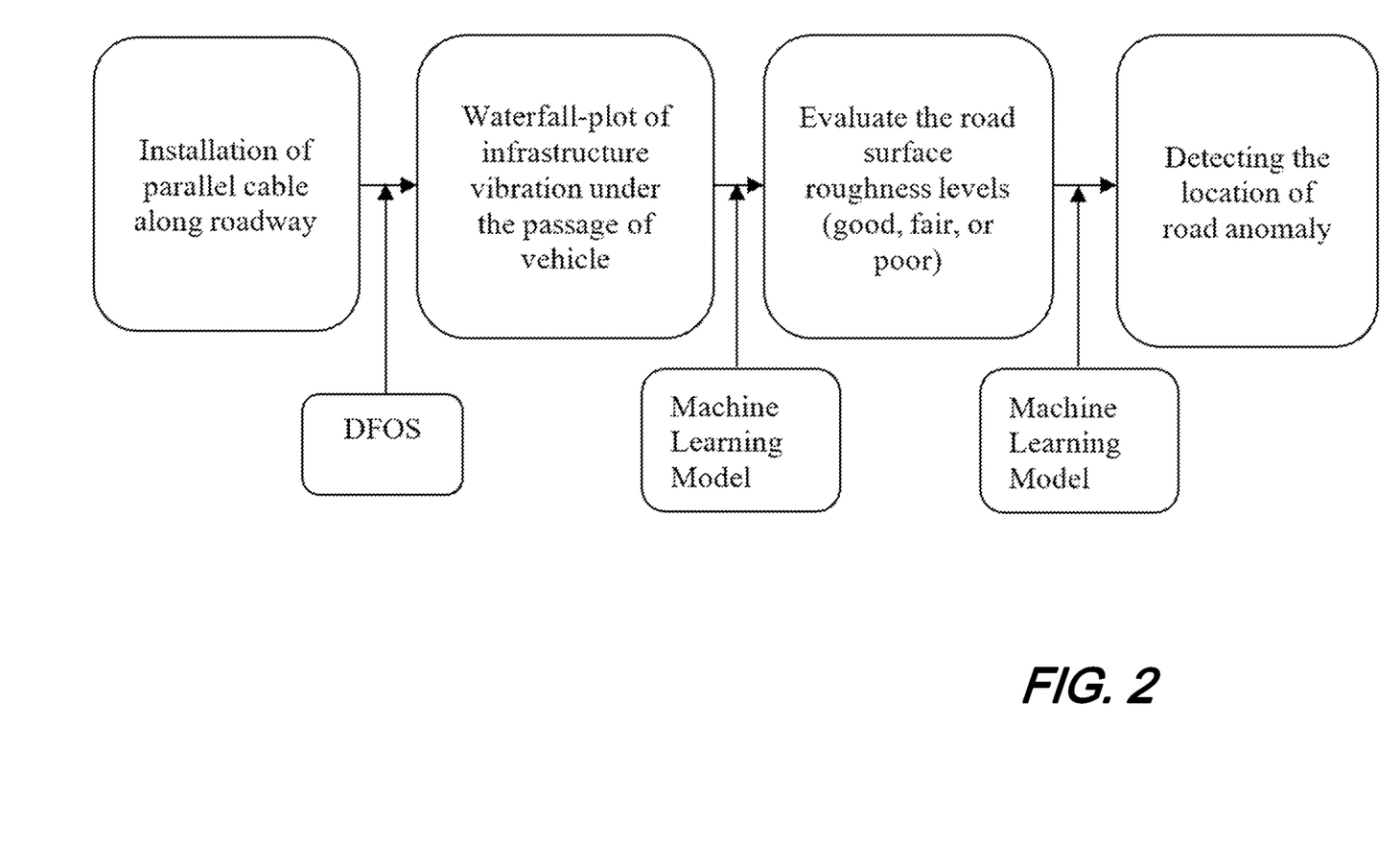
FIG. 2 is a flow diagram illustrating overall operational flow of method according to aspects of the present disclosure.

FIG. 2 is a flow diagram illustrating overall operational flow of method according to aspects of the present disclosure. As shown in that figure, our inventive systems and methods according to aspects of the present disclosure include the installation of an optical fiber sensor cable positioned parallel to a highway/roadway. A DFOS system is operatively connected to the optical fiber sensor cable so installed and waterfall plots of infrastructure vibrations during vehicle passage are generated. A machine learning model evaluates data resulting from the DFOS operation and evaluates road surface roughness levels such as good, fair, poor, etc. A machine learning model then operates on such data to detect location(s) of road anomalies.

Figure 3:
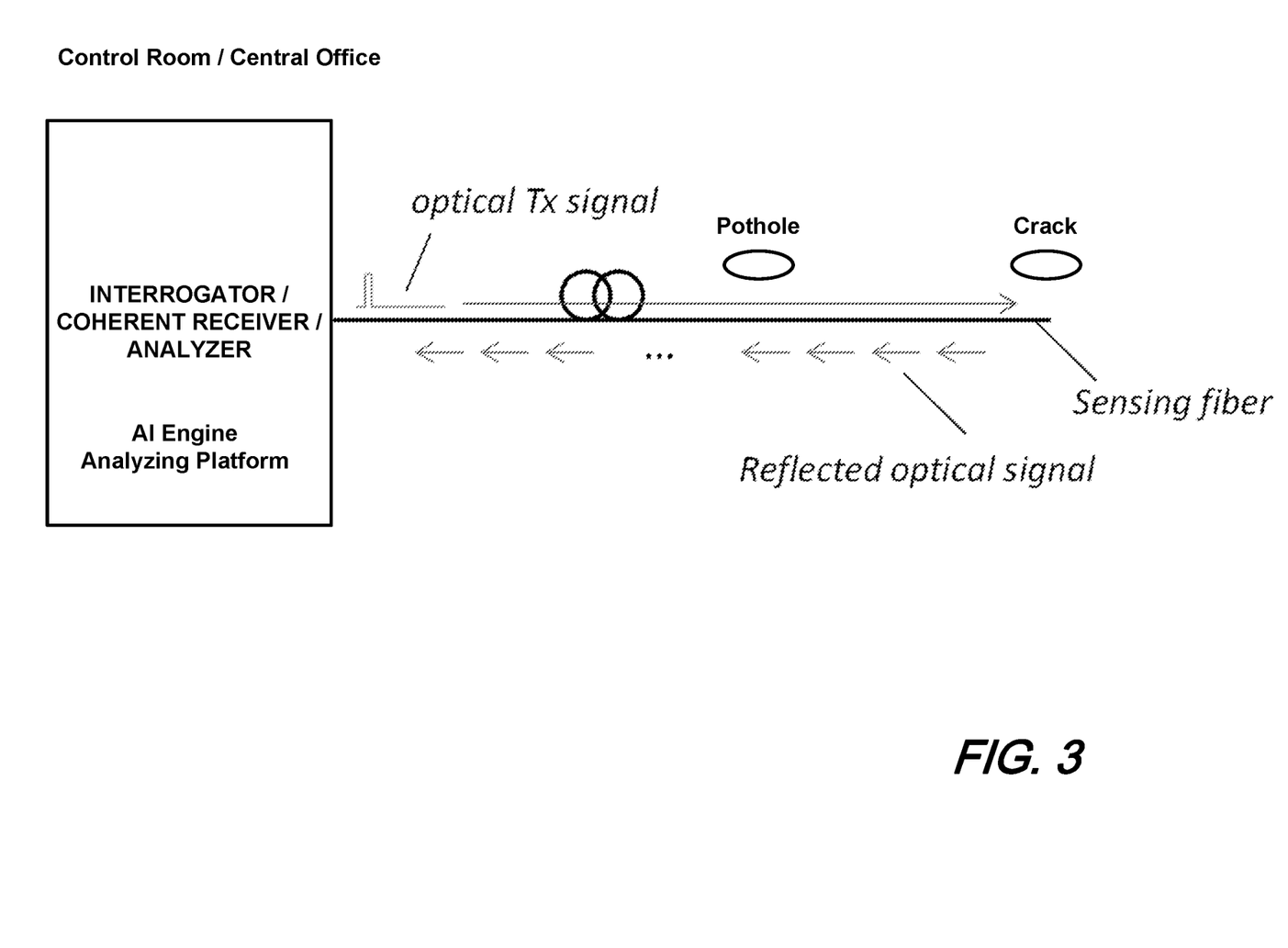
FIG. 3 is a schematic diagram showing illustrative system setup of auto pavement roughness level detection according to aspects of the present disclosure.

FIG. 3 is a schematic diagram showing illustrative system setup of auto pavement roughness level detection according to aspects of the present disclosure. As may be appreciated, it can be discussed in two parts namely, as sensing system setup, and data analyzing.

Step1: System Setup

The DFOS system is located in a remote terminal/central office providing real time, long-term, continuous, remote monitoring. The DFOS system may be configured to operate as a distributed acoustic sensor (DAS) or distributed vibration sensor (DVS).

The DFOS system is operatively connected to the optical sensor fiber which may advantageously be an existing, deployed telecommunications fiber or newly deployed. Such sensor fiber may simultaneously carry live telecommunications traffic in addition to the DFOS probe and scattered signals.

Figure 4:
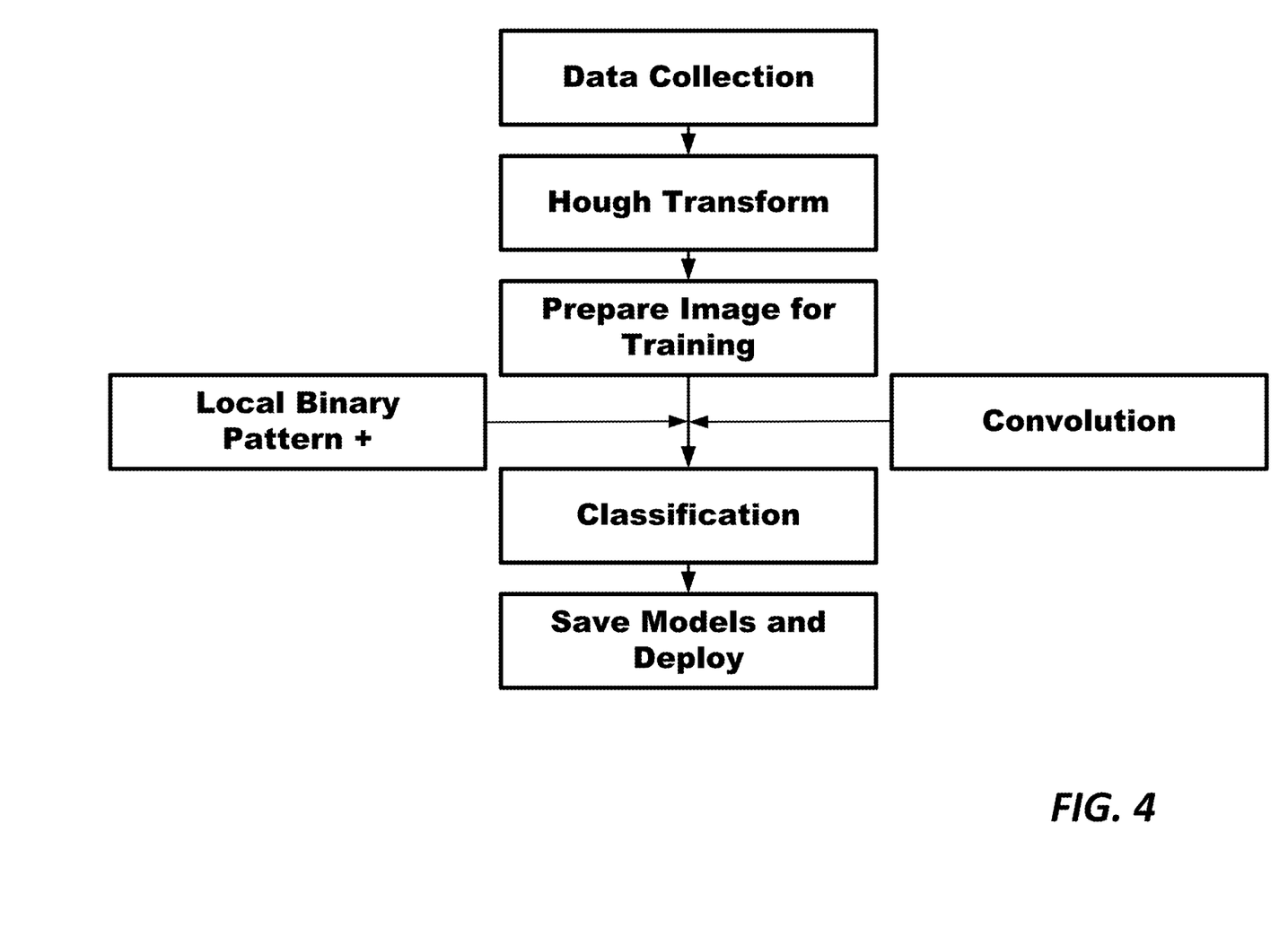
FIG. 4 is a schematic diagram showing illustrative framework of an analysis according to aspects of the present disclosure.

FIG. 4 is a schematic diagram showing an illustrative framework of an analysis according to aspects of the present disclosure.

Step 2: Data Analyzing:

The framework of the analysis as shown illustrates a first step to collect and annotate data. Next, vehicle speed is estimated based on detected lines using Hough transform.

Two methods are employed to detect potholes/cracks on road surface. The first method uses local binary pattern histograms to extract features of annotated images. Principal component analysis (PCA) is employed to reduce the dimension, and Support Vector Machine (SVM) is considered as classifier to train the model.

The second method uses a convolutional neural network (CNN) to train binary classification data and obtain the trained model. The training begins with image augmentation.

Finally, the trained model(s) based on SVM and CNN methods is/are deployed to detect speed bumps on the pavement and pavement roughness levels.

Hough Transform

Hough transform is a popular feature extraction technique to detect any shape which can be represented in mathematical form. It is effective in detecting the broken or distorted shapes Lines can be represented as y=a·x+b by two parameters: a and b. Since this equation cannot be used to represent vertical lines, normal parameterization is commonly used. Normal parameterization specifies a straight line by the angle $\theta$ of its normal and its algebraic distance $\rho$ from the origin, as expressed by the following equation $x \cos \theta + y \sin \theta = \rho$, where $0 \leq \theta \leq \pi$.

Therefore, the Hough space for lines has two dimensions: $\theta$ and $\rho$, and a line can be represented by a unique point $(\theta 0, \rho 0)$ in the $\theta$-$\rho$ plane.

Suppose there are some set $\{(x_1, y_1), (x_2, y_2), \ldots, (x_n, y_n)\}$ of n figure points and a set of straight lines are needed to fit them. The points $(x_i, y_i)$ can be transformed into the sinusoidal curves in the θ-ρ plane defined by ρ=x cos θ+y sin θ. The curve corresponding to colinear figure points have a common point of intersection. This point in the θ-ρ plane, $(θ_0, ρ_0)$, defines the line passing through the colinear points. Thus, the probability of detecting colinear points can be transformed to the issue of finding concurrent curves.

Local Binary Pattern (LBP)

LBP is a type of visual descriptor by combining the characteristics of statistical and structural texture analysis. LBP-based algorithms have been widely used to detect pavement cracks on road surfaces by extracting edge orientation and texture features of the captured images from cameras. The advantages of LBP include high discriminative power, computational simplicity, and invariance to grayscale changes It is performed based on gray scale invariant two-dimensional texture analysis. In LBP, the pixel of an image is labeled by thresholding the neighborhood of each pixel with the center value and considering the result of this thresholding as a binary number.

For example, if the center pixel intensity is smaller than the sample pixel intensity the value "1" is set, and "0" otherwise. The new matrix will contain binary values, and the central values is ignored. The binary value at each position was concentrated from the matrix line by line into a new binary value. The binary value is transformed to a decimal value and set as the central value of the matrix. The number of cells is used to divide the image into multiple grids and histograms of feature are plotted.

Formally, given a pixel at (xc, yc), the resulting LBP can be expressed in decimal form as follows $$LBP_{P,R}(x_c, y_c) = \Sigma_{P=0}^{P-1} S(i_p - i_c) 2^P$$

where ic and ip are, respectively, gray-level values of the central pixel and P surrounding pixels in the circle neighborhood with a radius R, and function s(x) is defined as:

$$S(x) = \begin{cases} 1, & x > 0 \\ 0, & x < 0 \end{cases}$$

From the definition, the basic LBP operator is invariant to monotonic gray-scale transformations, which preserve pixel intensity order in the local neighborhoods. The histogram of LBP labels calculated over a region can be exploited as a texture descriptor.

Support Vector Machine (SVM)

SVM produces nonlinear boundaries by constructing a linear boundary in a large, transformed version of the feature space. The basic principle behind SVM is to figure out an optimal separating hyperplane creating the biggest margin between the training data. The closest training points to the hyperplane are called support vectors [25]. For the training data consisted of N pairs $(x_1, y_1), (x_2, y_2), \ldots, (x_N, y_N)$, with $x_i \in R^P$ and $y_i \in \{-1, 1\}$. Define a hyperplane by:

$$\{x: f(x) = x^T \beta + \beta_0 = 0\}$$

where β is a unit vector $\|\beta\|=1$. A classification rule induced by f(x) is $$G(x) = sign[x^T \beta + \beta_0]$$

where f(x) gives the signed distance from a point x to the hyperplane $f(x) = x^T \beta + \beta_0 = 0$.

The classes are separated, so a function $f(x) = x^T \beta + \beta_0$ with $y_i f(x_i) > 0 \; \forall i$. Thus, it is available to find the hyperplane that maximizes the margin between training data for different classes.

The Optimization Problem $$\max_{\beta, \beta_0, \|\beta\|=1} M$$

Subject to $y_i(x_i^T \beta + \beta_0) \geq M, i = 1, \ldots, N$ captures this concept. The band is M units away from the hyperplane on either side, and then 2M units wide, which is called the margin. Therefore, optimization problem can be more conveniently expressed by the following equations for support vector criterion of separable data.

$$\min_{\beta, \beta_0} \|\beta\|$$

Subject to $y_i(x_i^T \beta + \beta_0) \geq 1, i = 1, \ldots, N$

Noted that $M = \dfrac{1}{\|\beta\|}$

Convolutional Neural Network (CNN)

CNN has been applied in particular to image classification for structural health monitoring. This network topology focuses on the ability of computer systems to learn patterns within data without being explicitly programmed for these patterns. CNN could be implemented on Keras with backend as Theano and Tensorflow to produce accuracy of classification. Keras is a high-level neural network, which is written in Python.

CNN is used to reduce the actual input size of the image by implementing convolution and characterize the important features of the image required for the classification and ignoring the unnecessary features. CNN architecture consisted of convolutional, max-pooling, and classification layers. Convolutional layer is a layer that consists of several filters and each filter is convolved with the input image as programmed. The input shape of the images was reduced by the convolutional layers depending on the number of features applied. The feature maps of the images were derived. The following table shows the specifics of the convolutional network used for the training of the model in the study.

| CONVOLUTIONAL NETWORK TRAINING MODEL | | | | | |
|---|---|---|---|---|---|
| Layers | 1 | 2 | 3 | 4 | 5 |
| Stage | Conv2D | MaxPooling | Dropout | Flatten | Dense |
| Channels/filters | 8 | — | 0.25 | — | 2 |
| Kernel Size | (3, 3) | (2, 2) | — | — | — |
| Activation | Relu | — | — | — | Sigmoid |
| Shape | (22, 28, 8) | (11, 14, 8) | (11, 14, 8) | 1232 | 2 |

Keras neural network library was able to conduct image augmentation which was suitable for small dataset to prevent overfitting issue. Image augmentation is the method of transforming the input image with certain parameters to teach the network that all the images are the same irrespective of the transforms done. Many image augmentation types were available, and the meaning of the altered images should be considered to choose the image augment types. The width shift, height shift, and horizontal flip were selected as the parameters for generating more data in this study. Keras has this process inbuilt and conducted by the class called Image data generator.

Data Collection and Preparation

Figure 5:
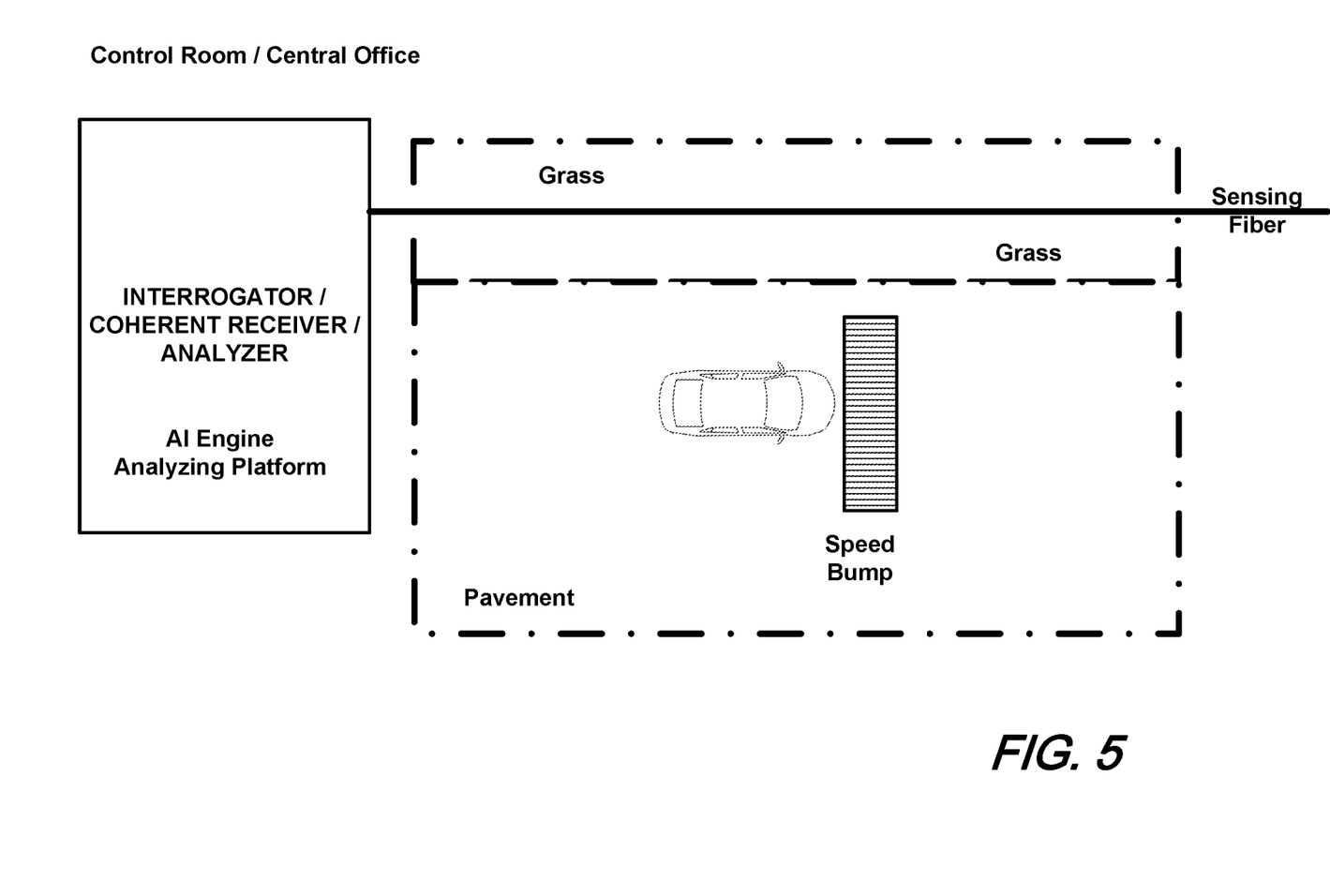
FIG. 5 is a schematic diagram showing an illustrative experimental setup according to aspects of the present disclosure.

FIG. 5 is a schematic diagram showing an illustrative experimental setup according to aspects of the present disclosure.

Shown in this figure is an illustrative experimental setup using a DAS system located in central office (CO) and a speed bump located on a road surface. When a vehicle drives over the speed bump, the vibration signals produced effectively simulate road anomalies such as potholes, big cracks, etc. As employed, the speed bumps were rubber safety bumps that are 6-inches in height and located such that they are aligned perpendicular to the optical fiber.

Waterfall data collected from experimental operation is subjected to Hough transform. From the transformed data, vehicle vibration, speed bump characteristics, and vehicle speed are determinable. The Hough transform also facilitates localizing any vehicle passing events on the waterfall temporal-spatial plane and helps detect any locations of abnormal driving signals, since the signals indicate the pothole or cracking always appear on the vehicle trajectory. A following classifier scans an image patch adjacent to the vehicle instead of full waterfall plot when detecting the pothole location. Advantageously, that significantly reduces computation cost because the waterfall signal is highly sparse and only low percentage of data indicate useful information.

Further with our experimental observations, a waterfall trace was obtained in a 100-second window including 400 sensing points. Since only one speed bump was placed on road, there were two strips observed in the plots, of which each strip represents one axle of vehicle was passing over the speed bump. As expected, ground vibration was dramatically enhanced when a vehicle was moving over the bumps as compared to the vibration on normal road surface. The intensities at locations having speed bumps were higher than those of the locations without bumps.

Still another test was performed during a period of rain and a waterfall trace was obtained during a wet roadway surface condition. Ground vibration was observed to be weakened after the rain which may produce a change in mechanical interaction between road surface and vehicle tires, as well as modulus of pavement structure, and modulus of soil.

As is known DAS is a relatively recent development in the use of fiber optic cable for the measurement of ground motion. DAS system can provide distributed strain sensing based on Rayleigh scattering. Dynamic strain changes along the optical fiber can be captured and related to the ambient acoustic wave field. DAS has several advantages over geophones. Unlike geophones, DAS is not limited in a horizontal tube or ultra-slim tube due to its slim cable. The cost of optical fiber is lower, and it is easier to install together with other optical fiber sensors, including Distributed Temperature Sensing (DTS) and Distributed Pressure Sensing (DPS).

DAS is capable of measuring with complete horizontal coverage without movements of the fiber, which ensures the data continuity. In DAS system, dynamic vibration can be detected along the entire optical fiber with a high spatial resolution. The existing commercial telecommunication equipment and tools can be utilized for traffic and road surface condition monitoring rather than new layout of DFOS or strain gauges in pavement structure.

The collected images were categorized into two major classes: with and without bumps. For the case with speed bumps, the images were captured at the corresponding location. To make sure the sample size was sufficiently large, images were extracted randomly from the water-fall plot for the class of normal road surface without bumps. The sizes of these images was 24×30 pixels in Portable Network Graphics (PNG) format.

Two datasets were collected in central New Jersey. The field tests were performed on Jun. 25, 2019, and Aug. 7, 2019, respectively. On June 25th, it was sunny, and the pavement surface was dry. 250 images, including pavement sections with and without speed bumps, were extracted for the dataset. On Aug. 7, 2019, it was rainy, and the pavement surface and soil were wet. 120 images, including both cases, were extracted for the dataset. Due to the change of weather conditions in two tests, the datasets were processed and analyzed separately. All the data processing and analysis were performed in Python with required modules inbuilt.

Line Detection Based on Hough Transform

In the water-fall plot of data, Hough transform was utilized to detect the straight lines by connecting the points or strips with high intensities, which were generated by the bumps on pavement surface. The slope of the line indicated the vehicle speed. The number of vehicles could also be counted by accumulating the number of straight lines. The estimated speeds were 5.6 m/s (20 km/h) and 6.4 m/s (23 km/h), respectively. The vibration signals were found enhanced at the location of sewage between the bumps due to the concrete structure.

Results of LBP and SVM Based Method

The datasets were divided into two sets: training (90%) and test data (10%). LBP were applied on the images of the data, and the histograms of the resulting images were obtained. Each histogram contains 256 positions representing the occurrences of each pixel intensity, and the histogram represents the characteristics of the original image. The results indicated that the LBP histograms picked up at pavement sections with and without speed bumps were different. The LBP histograms of each image could be considered as features in the classifier. A comparison of LBP histograms between the case with and without speed bump collected on dry road shows that there are significant differences in the percentage of pixel between the two cases. For example, at the pixel intensities of 250-255, the percentages of pixel in the case without bump apparently larger than those in the case with bump. While, at the pixel intensities of 145-155, the percentage of pixel in the case with bump was larger. The similar trends could be observed on wet road.

The road surface conditions (dry/wet) significantly impacted the LBP histograms. LBP histograms were efficient to the extraction of image features to detect road anomaly.

A confusion matrix of classifying results was prepared for the dataset collected on dry road surface. As prepared, predicted classes are represented in rows of the matrix, while the true classes are in columns of the matrix. Color may be employed to distinguish each region such that it corresponds to the number of images which are predicted or predefined in each class. The number of false positives and false negatives were 0 and 2, respectively. The accuracy of predictive model was 97%. A confusion matrix of classifying results for the dataset collected on wet road surface showed that the number of false positives and false negatives were 3 and 0, respectively. The accuracy of predictive model was 90%. The comparison indicates the weather and road surface condition are vital parameters to the development of predictive models.

Result of Convolutional Neural Network Method

For the convolutional neural network method, each dataset was divided into three sets: training (72%), validation (18%), and test data (10%). Training the neural network for the classification was done for 5 epochs and the model and weights are saved for future deployment and modifications. The accuracy and loss curves were plotted. The accuracy and loss of the training and validation data on dry road surface were 100% and 0.48, respectively. The accuracy and loss of training and validation data on wet road surface. The test accuracy and loss on test data were 100% and 0.16, respectively.

The comparison of classification accuracies between the proposed methods indicates the high accuracy of the convolutional network model on dry and wet road surface conditions. Limited structural information was involved in the LBP histograms, and computational complexity may be increased by the size of features in terms of time and space. However, the convolutional network training model required large datasets to avoid the overfitting issue.

In conclusion, DFOS was implemented to capture ground vibrations in sunny and rainy weather conditions. The speed bumps were placed on road surface to imitate the vibration signals generated by road anomaly and to localize the vehicle on multi-lane roadway. LBP histograms could effectively characterize the features of images. The LBP and SVM based methods were efficient to the detection of road anomaly. Compared to LBP and SVM based method, the CNN method enhanced the accuracy of predictive model. However, more datasets were needed to overcome the overfitting issue. DFOS is practical for traffic monitoring (traffic volume accumulation and vehicle speed estimation) and road anomaly detection. It has potential to be implemented in smart road. Since the experiment can only be conducted at specific locations, the size of sample was relatively small. Some critical parameters, such as pavement structure and environmental factors, cannot be involved in the trained model based on the limited data. The accuracy will be enhanced, and the application will be extended if more datasets are collected. In future study, the trained model will be utilized in real-time engine for vehicle detection on multi-lane roadway. The technology can be extended to road anomaly detection by combining with sliding window technology.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for road surface conditions detection using distributed fiber optic sensing (DFOS), said method comprising:
   providing a length of optical sensor fiber, said length of optical sensor fiber being positioned parallel to the road surface;
   providing a DFOS interrogator in optical communication with the optical sensor fiber, said DFOS interrogator configured to generate optical pulses, introduce the generated pulses into the length of optical sensor fiber, and receive backscattered signals from the length of the optical sensor fiber; and
   providing an intelligent analyzer configured to analyze the received backscattered signals and determine from the backscattered signals, vibrational activity occurring at locations along the length of the optical sensor fiber;
   determine vehicle speed of vehicles operating on the road surface from the backscattered signals using Hough transform methods;
   determine locations of potholes or cracks in the road surface; and
   outputting an indicium of the pothole or crack locations;
   wherein the intelligent analyzer determines the vibrational activity occurring at locations along the length of the optical sensor fiber by generating annotated waterfall plot images from the backscattered signals and extracting features of the annotated images using local binary pattern histograms, and by performing a principal component analysis (PCA) on the annotated images such that a dimension is reduced and employing a support vector machine methodology as a classifier to generate a trained model; and
   wherein a convolutional neural network (CNN) is used to train binary classification data to generate a trained model.

2. The method of claim 1 further comprising deploying the trained model based on support vector machine (SVM) and CNN to detect road roughness level(s) and classify such level(s) as good, fair, or poor.

3. A system for road surface condition detection comprising:
   a DFOS interrogator in optical communication with an optical sensor fiber positioned along the road surface, said DFOS interrogator configured to:
   generate optical pulses, introduce the generated pulses into the length of optical sensor fiber, and receive backscattered signals from the length of the optical sensor fiber;
   an intelligent analyzer configured to:
   analyze the received backscattered signals and determine from the backscattered signals, vibrational activity occurring at locations along the length of the optical sensor fiber;
   determine vehicle speed of vehicles operating on the road surface from the backscattered signals using Hough transform methods;
   determine locations of potholes or cracks in the road surface; and
   output an indicium of the pothole or crack locations;
   wherein the intelligent analyzer determines the vibrational activity occurring at locations along the length of the optical sensor fiber by generating annotated waterfall plot images from the backscattered signals and extracting features of the annotated images using local binary pattern histograms, and by performing a principal component analysis (PCA) on the annotated images such that a dimension is reduced and employing a support vector machine methodology as a classifier to generate a trained model; and
   wherein a convolutional neural network (CNN) is used to train binary classification data to generate a trained model.

4. The system of claim 3 wherein the trained model is based on support vector machine (SVM) and CNN to detect road roughness level(s) and classify such level(s) as good, fair, or poor.

* * * * *